(12) United States Patent
Kitahori et al.

(10) Patent No.: US 7,570,460 B2
(45) Date of Patent: Aug. 4, 2009

(54) BOSS LOCATION TO ADJUST HEAD ATTITUDE

(75) Inventors: Hiroki Kitahori, Kanagawa (JP); Shinichi Kimura, Kanagawa (JP); Satoshi Matsumura, Kanagawa (JP); Akira Morita, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 587 days.

(21) Appl. No.: 11/305,493

(22) Filed: Dec. 15, 2005

(65) Prior Publication Data

US 2006/0126227 A1 Jun. 15, 2006

(30) Foreign Application Priority Data

Dec. 15, 2004 (JP) ............................ 2004-362836

(51) Int. Cl.
*G11B 5/55* (2006.01)
*G11B 21/08* (2006.01)

(52) U.S. Cl. ..................................... 360/265.6; 384/537
(58) Field of Classification Search ................ 360/265, 360/265.2, 265.3, 265.4, 265.5, 265.6, 274, 360/294.6, 294.7, 244.5
See application file for complete search history.

(56) References Cited

U.S. PATENT DOCUMENTS

| 4,632,576 | A | * | 12/1986 | Neal ........................... 384/537 |
| 4,698,709 | A | * | 10/1987 | Ihlenburg et al. ........ 360/265.6 |
| 4,772,139 | A | * | 9/1988 | Bretton ....................... 384/537 |
| 5,099,374 | A | * | 3/1992 | Ohkita et al. ............. 360/265.6 |
| 5,539,597 | A | * | 7/1996 | Blanks ..................... 360/265.6 |
| 6,318,900 | B1 | * | 11/2001 | Bere et al. .................. 384/535 |
| 6,490,124 | B1 | | 12/2002 | Yamamoto et al. |
| 7,170,716 | B2 | * | 1/2007 | Van Sloun et al. ....... 360/244.6 |
| 2002/0044387 | A1 | * | 4/2002 | Miyamoto ............... 360/256.4 |
| 2003/0147179 | A1 | * | 8/2003 | Hashizume et al. ...... 360/256.4 |
| 2005/0063091 | A1 | * | 3/2005 | Kawakami et al. ....... 360/97.01 |
| 2006/0141816 | A1 | * | 6/2006 | Kitahori et al. ............... 439/67 |

FOREIGN PATENT DOCUMENTS

| JP | 59-094275 | 5/1984 |
| JP | 64-18422 | 1/1989 |
| JP | 06-084275 | 3/1994 |

* cited by examiner

*Primary Examiner*—Brian E Miller
*Assistant Examiner*—Adam B Dravininkas
(74) *Attorney, Agent, or Firm*—Townsend and Townsend and Crew LLP; Darren Gold

(57) ABSTRACT

Embodiments of the present invention provide a structure of a pivot receiving surface which may excellently adjust the attitude of a head supporting mechanism in a magnetic disk drive. In one embodiment, three projections are formed at a base for supporting a pivot assembly. The first projection is formed on a first line which bisects an angle defined between a second line and a third line determining a range, in which a head/slider flies above a magnetic disk. In contrast, the other two projections are formed at positions apart from the first projection at an angle of 120°, respectively. The attitude of the pivot assembly is adjusted by adjusting the heights of the projections, and thus, a head supporting mechanism is corrected in a predetermined attitude within the range in which the head/slider flies above the magnetic disk.

20 Claims, 12 Drawing Sheets (A)

(B)

(C)

Head/slider direction (A)

(B)

(C)　　　　　　　　(D)

(A)

(B)

(A)

(B)

(C)

(A)

(B)

BOSS LOCATION TO ADJUST HEAD ATTITUDE

CROSS-REFERENCES TO RELATED APPLICATIONS

This application claims priority from Japanese Patent Application No. JP2004-362836, filed Dec. 15, 2004, the entire disclosure of which is incorporated herein by reference.

BACKGROUND OF THE INVENTION

The present invention relates to a structure of a pivot receiving surface formed at a base so as to support an abutment surface of a pivot assembly disposed in a head supporting mechanism in a magnetic disk drive and, more particularly, to a structure of a pivot receiving surface which may adjust the attitude of a head supporting mechanism.

A head/slider flies above a magnetic disk with a slight clearance (hereinafter referred to as "a flying height") in a magnetic disk drive. A load beam is attached to a tip of a carriage assembly of a rotary type, and thus, is designed to be rotated above the magnetic disk. To the load beam is attached a flexure, to which the head/slider is fixed in such a manner as to achieve a flexible operation by means of the flexure.

The carriage assembly is provided with a pivot opening, into which a pivot assembly is inserted, at the center thereof. A housing of the pivot assembly and the carriage assembly are integrated by fixing a shaft of the pivot assembly to the base, such that they can be rotated by a voice coil motor (hereinafter abbreviated as "a VCM"). Since a clearance between the load beam and the surface of the magnetic disk markedly influences the flying performance of the head/slider, the clearance needs to fall within a predetermined range at least within a range in which the head/slider flies.

The magnetic disk is disposed in a hub of a spindle motor in such a manner as to be parallel to a predetermined reference surface. Therefore, unless the load beam also must be operated while keeping a predetermined clearance with respect to the same reference surface, the clearance between the load beam and the surface of the magnetic disk is varied according to the position of the magnetic disk, so that the head/slider cannot fly at a stable flying height. Also in the case where the load beam is inclined in a direction perpendicular to the rotating direction of the load beam, the flying performance is degraded.

A surface formed at the base for supporting the pivot assembly is referred to as "a pivot receiving surface" in the present specification. The attitude of the pivot receiving surface determines the attitude of the pivot assembly, and further, the attitude of the pivot assembly determines the attitude of the carriage assembly. Since the load beam is disposed in the carriage assembly, the magnetic disk drive needs to be configured such that the pivot receiving surface takes the correct attitude in order to achieve the correct attitude of the load beam.

In recent years, the flying height of the head/slider has become lower, and further, higher accuracy has been required for the attitude of the load beam for supporting the head/slider with respect to the surface of the magnetic disk. This cannot be satisfactorily coped with by the conventional structure of the pivot receiving surface. Japanese Patent Laid-open No. 2001-28161 discloses the technique of drawing a chassis at three points in order to fix a spindle motor. Japanese Patent Laid-open No. Hei 6-84257 discloses the technique of supporting a disk at three points by the use of a ball in order to clamp the disk with high accuracy. Japanese Utility Model Laid-open No. Sho 64-18422 discloses the technique of supporting an optical head at three points. Japanese Patent Laid-open No. Sho 59-94275 discloses the technique of supporting a disk at three points in order to eliminate a radial clearance between a bearing inner/outer race of a pivot cartridge and a bearing ball.

BRIEF SUMMARY OF THE INVENTION

In view of the above description, a feature of the present invention is to provide a structure of a pivot receiving surface suitable for readily adjusting the attitude of a head supporting mechanism with respect to a surface of a magnetic disk within a range in which a head/slider flies above the magnetic disk. Another feature of the present invention is to provide a magnetic disk drive for supporting a head supporting mechanism by adopting the above-described structure of a pivot receiving surface so as to provide a stable flying height for a head/slider.

The principle of the present invention resides in that a pivot receiving surface for supporting a pivot assembly in a magnetic disk drive is constituted of three projections, which are arranged in such a manner that the attitude of the pivot assembly may be readily adjusted within a flying range of a head/slider. According to a first aspect of the present invention, there is provided a structure of a pivot receiving surface in a magnetic disk drive including a head supporting mechanism having a head/slider mounted thereon, a magnetic disk, a pivot assembly for rotatably supporting the head supporting mechanism and a base for supporting an abutment surface of the pivot assembly, in which the pivot receiving surface is formed at the base. The abutment surface is supported by a first projection, a second projection and a third projection at the pivot receiving surface, assuming that a line passing through the center of the pivot assembly and the center of an edge on a side, on which a head in the head/slider is disposed, is referred to as a rotation center line of the head supporting mechanism, a line defined by the rotation center line when the head/slider is located at a most inside position, at which the head/slider flies above the magnetic disk, is referred to as an inside center line, and a line defined by the rotation center line when the head/slider is located at a most outside position, at which the head/slider flies above the magnetic disk, is referred to as an outside center line, the first projection being formed at a position, through which the outside center line or the inside center line passes, or between the outside center line and the inside center line, through which the rotation center line passes; the second projection being formed in one region of the base bisected by the rotation center line passing through the first projection; and the third projection being formed in the other region of the base bisected by the rotation center line passing through the first projection.

The first projection is formed within a range defined by the outside center line and the inside center line in the range in which the head/slider actually flies above the magnetic disk. Consequently, if the attitude of the pivot receiving surface in a pitch direction is adjusted by adjusting the height of the first projection, the attitude of the head supporting mechanism may be readily adjusted in the range in which the head/slider flies. The second projection and the third projection are formed on the different sides in the region on the base bisected by the rotation center line passing through the first projection, respectively, so that the inclinations of the pivot receiving surface in the pitch direction and a roll direction may be corrected by adjusting the heights of the three projections, thereby readily adjusting the attitude of the head supporting mechanism in the range in which the head/slider flies.

If the first projection is formed at a position, through which the rotation center line for bisecting an angle defined between the inside center line and the outside center line passes, a predetermined attitude of the head supporting mechanism may be set in the best balance within the range defined by the outside center line and the inside center line when the attitude of the pivot receiving surface in the pitch direction is adjusted at the height of the first projection. Even if the first projection is formed nearer the head/slider than the second projection and the third projection, or to the contrary, on the side of a voice coil motor, a similar effect may be produced. If the first projection, the second projection and the third projection are configured such that the length of a line connecting the first projection to the second projection is equal to the length of a line connecting the first projection to the third projection, a correction with respect to the second projection or the third projection becomes substantially the same as an inclination of the head supporting mechanism even if the head supporting mechanism is inclined on either side of the roll direction, thereby facilitating the correction. With the configuration such that the lengths of lines mutually connecting the first projection, the second projection and the third projection are equal to each other, the correction may be achieved in the good balance in the range in which the head/slider flies even if the head supporting mechanism is inclined in either of the pitch direction and the roll direction.

It is convenient for forming each of the projections at the top of a boss formed at the base since the height of the pivot assembly may be adjusted by the boss and may be finely adjusted by each of the projections. In the case where the base is molded by pressing a steel plate, the first projection is formed within the range in which the rotation center line is rotated, thereby facilitating the fabrication of a pressing die for achieving the predetermined attitude of the pivot receiving surface.

The most inside position, at which the head/slider flies above the magnetic disk, may be set at a position in contact with an inner crush stop for physically limiting a movable range of the head supporting mechanism. The most outside position, at which the head/slider flies above the magnetic disk, may be set at a position, at which a lift tab of the head supporting mechanism is brought into contact with a ramp in a magnetic disk drive which adopts a load/unload system; in contrast, it may be set at a position in contact with an outer crush stop for physically limiting the movable range of the head supporting mechanism in such a manner that the head/slider cannot go out of the surface of the magnetic disk in a magnetic disk drive which adopts a contact start/stop system.

The present invention may provide the structure of the pivot receiving surface suitable for readily adjusting the attitude of the head supporting mechanism with respect to the surface of the magnetic disk within the range in which the head/slider flies above the magnetic disk. Furthermore, the present invention may provide the magnetic disk drive for supporting the head supporting mechanism by adopting the above-described structure of the pivot receiving surface so as to provide the stable flying height for the head/slider.

DETAILED DESCRIPTION OF THE INVENTION

Figure 8:
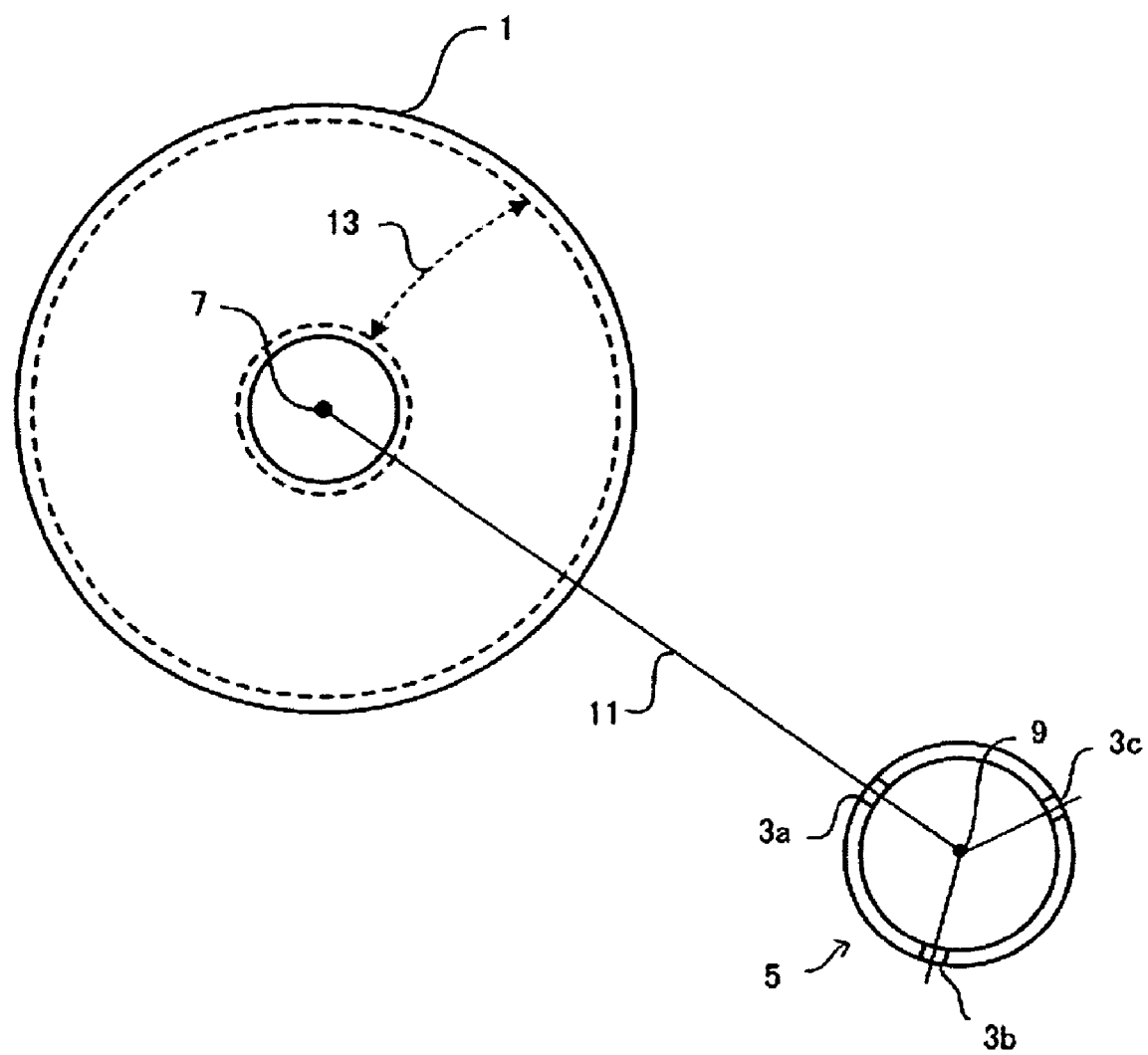
FIG. 8 is a view showing a structure of the pivot receiving surface in the magnetic disk drive in the preferred embodiment.

One embodiment of a pivot receiving surface in a magnetic disk drive is shown in FIG. 8, in which a boss 5 having three projections 3a, 3b and 3c formed thereon is disposed at the bottom of a base, and further, a pivot receiving surface constituted of the three projections is designed to support an abutment surface formed at the bottom of a pivot assembly. In this case, the three projections are arranged such that the first projection 3a is formed in such a manner that the center of the first projection 3a is located on a line 11 connecting a rotation center 9 of a carriage assembly, which is referred to also as the center of the pivot assembly, and a rotational center 7 of a magnetic disk 1 to each other, and that the second projection 3b and the third projection 3c are formed at an equiangular interval of 120° on the rotation center 9.

The above-described arrangement is convenient for determining mainly the positions of the projections 3a, 3b and 3c in reference to the rotational center 7 of the magnetic disk and the center 9 of the pivot assembly, and further, for accurately maintaining a clearance between a load beam and the magnetic disk in a region of the entire magnetic disk. Here, the structure of the pivot receiving surface shown in FIG. 8 needs to be developed in the point of the accurate determination of the attitude of the load beam with respect to the surface of the magnetic disk within a range indicated by an arrow 13, in which a head/slider is actually rotated.

Figure 1:
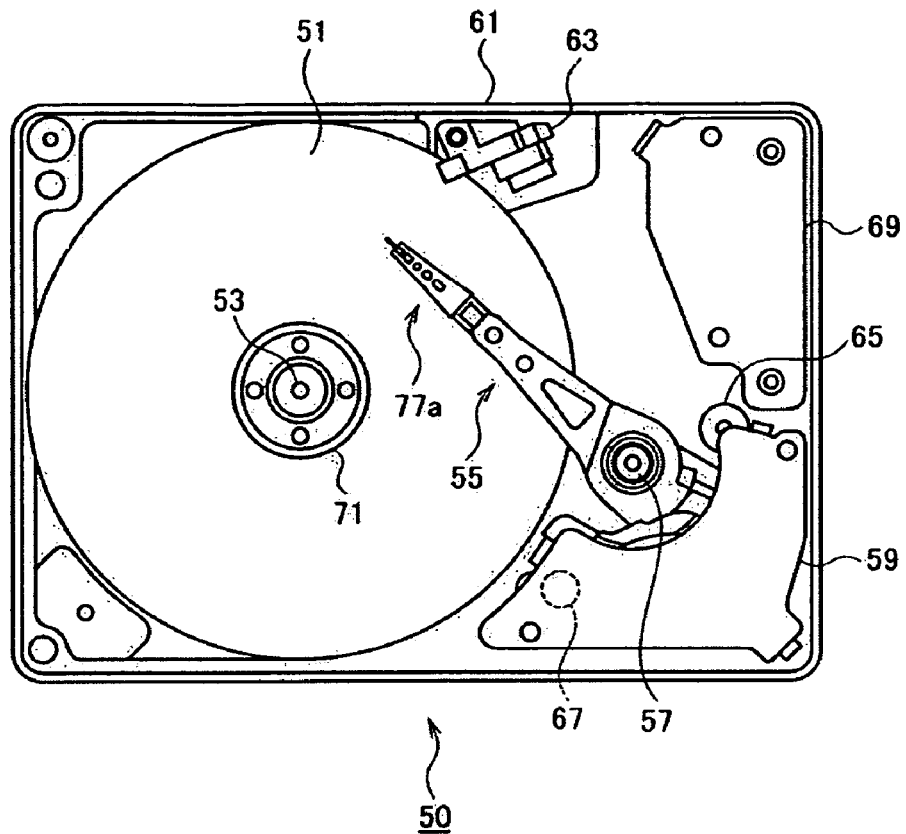
FIG. 1 is a plan view showing a magnetic disk drive in an embodiment according to the present invention.
Figure 2:
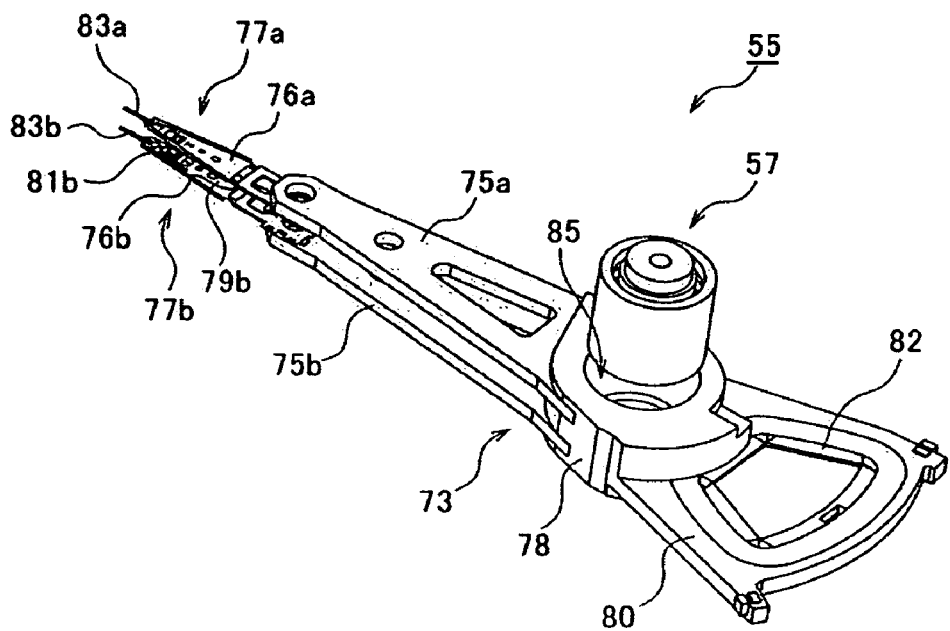
FIG. 2 is a perspective view showing a head stack assembly.

A description will be given below of a structure of a pivot receiving surface and a magnetic disk drive, to which the structure is applied, in specific embodiments in reference to the drawings. FIG. 1 is a plan view showing a magnetic disk drive 50 in an embodiment according to the present invention. FIG. 2 is a perspective view showing a head stack assembly (hereinafter abbreviated as "an HSA") 55. A magnetic disk drive 50 houses a magnetic disk 51, the HSA 55, a ramp 63, a flexible cable fixing plate 69 and a voice coil yoke 59 inside of a base 61. The base 61 is molded by pressing a stainless steel plate. Although the present invention is applicable also to a base 61 of a die cast structure, a pivot receiving surface formed at the base molded by pressing may exhibit a remarkable effect. In the case where the base has a die cast structure, a flat surface may be formed at the base by cutting, and then, projections may be formed at an abutment surface of a pivot assembly.

The magnetic disk 51 has recorded surfaces on both sides thereof, and is fixed to a hub of a spindle motor, not shown, via a clamp spring 71 so as to be rotated at a predetermined rotational speed on a spindle 53. The HSA 55 has head gimbal assemblies (hereinafter abbreviated as "HGAs") 77a and 77b and a carriage assembly 73. The carriage assembly 73 includes actuator arms 75a and 75b, a bearing housing 78 and a coil support 80. At the bearing housing 78 is formed a pivot through hole 85, into which a pivot assembly 57 is inserted, so that the carriage assembly 73 is fixed to the base 61.

The coil support 80 holds a voice coil 82 therein. The HGAs 77a and 77b include load beams 76a and 76b attached to the actuator arms 75a and 75b, respectively, a flexure 79b attached to the load beam 76b in a manner facing to the surface of the magnetic disk, and a head/slider 81b attached to the flexure 79b. Here, another flexure is attached to the load beam 76a in the same manner and another head/slider is attached to that flexure, although not shown in FIG. 2.

The magnetic disk drive 50 adopts a load/unload system. At the tips of the HGAs 77a and 77b are respectively formed lift tabs 83a and 83b for allowing the head/sliders to retreat on the ramp 63 before the rotation of the magnetic disk 51 is stopped. The HSA 55 is driven by a voice coil motor including the voice coil 82 and the voice coil yoke 59, and is rotated around the pivot assembly 57. The HSA 55 can abut an inner crush stop 65, and thus, its movement is limited when the head/slider is moved toward the inner circumference of the magnetic disk. The HSA 55 can abut an outer crush stop 67, and thus, its movement is stopped when the head/slider is moved toward the outer periphery of the magnetic disk, and then, retreats on the ramp. In the magnetic disk drive of a contact start/stop system, an outer crush stop is disposed in such a manner that the HSA abuts the outer crush stop at a position at which the head/slider never goes out of the surface of the magnetic disk.

Figure 3:
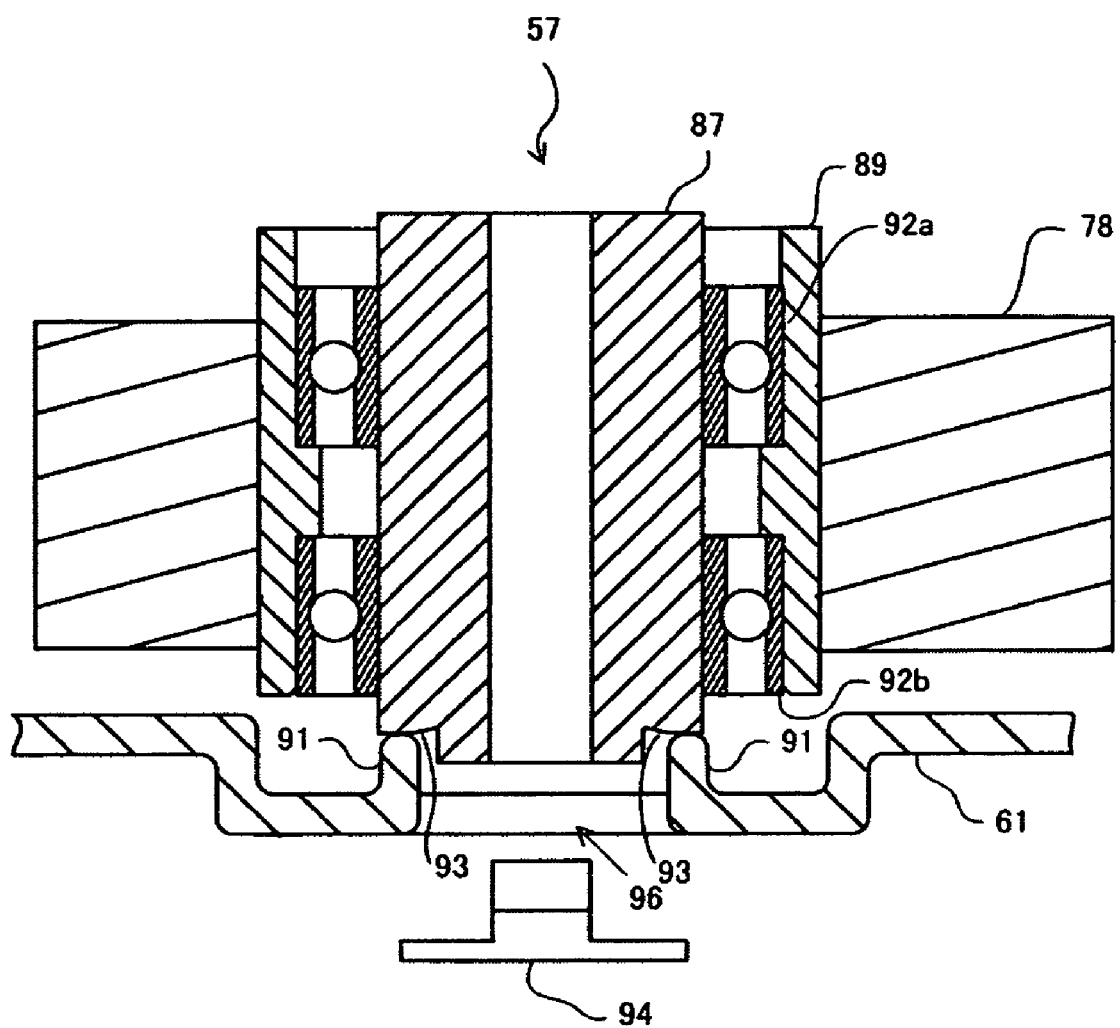
FIG. 3 is a cross-sectional view showing a pivot assembly which is housed inside of a bearing housing of an HSA and is fixed to a base.

FIG. 3 is a cross-sectional view showing the pivot assembly 57 which is housed inside of the bearing housing 78 of the HSA 55 in a fitting structure by interference fitting or clearance fitting and is fixed to the base 61. The pivot assembly 57 has a rotary shaft 87, two radial ball bearings 92a and 92b disposed at upper and lower positions of the rotary shaft 87, respectively, and a pivot housing 89 rotatably disposed via the radial ball bearings 92a and 92b. At the bottom of the base 61 is formed a boss 91 around a through hole 96. An abutment surface 93 formed at the bottom of the rotary shaft 87 in the pivot assembly 57 is supported by the boss 91. In the pivot assembly 57, the rotary shaft 87 is fixed to the base 61 via a screw 94.

Figure 4:
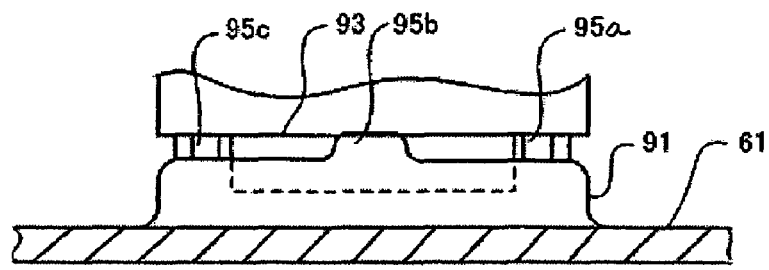
FIGS. 4(A) to 4(C) are a side view and plan views showing a detailed structure of a boss formed at a base.
Figure 4:
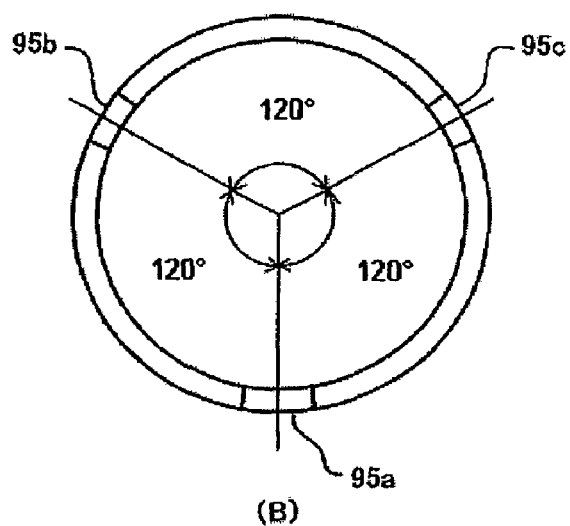
Figure 4:
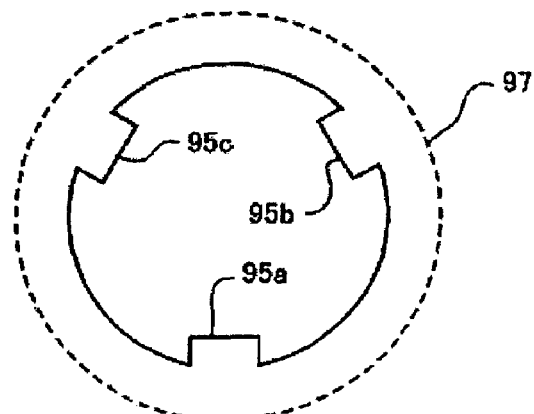

FIGS. 4(A) to 4(C) are a side view and plan views showing the detailed structure of the boss 91 formed at the base 61. As shown in FIGS. 4(A) and 4(B), three projections 95a, 95b and 95c are formed at the top of the boss 91, so as to support the abutment surface 93 of the rotary shaft 87. In other words, a flat surface defined by connecting the positions of the abutment surface 93 in contact with the projections 95a, 95b and 95c serves as a pivot receiving surface, which supports the abutment surface 93 so as to determine the attitude of the pivot assembly 57 with respect to the base 61. The projections 95a, 95b and 95c are arranged on the boss 91 with mutually equal intervals in such a manner that lines connecting the respective middles of the projections 95a, 95b and 95c and the center of the boss 91 to each other are arranged at an equal angle of 120°.

FIG. 4(C) illustrates one method for forming the boss 91 and the projections 95a, 95b and 95c. First of all, the bottom of the base 61 is punched by a pressing die while the projections 95a, 95b and 95c remain. Subsequently, the boss 91 is bent inward of the base 61 by burring or the like in reference to the circumference of a circle 97 as a bending position. Next, the bent boss 91 is pressed downward with a die in conformity with the projection, thereby forming the projections 95a, 95b and 95c.

Figure 5:
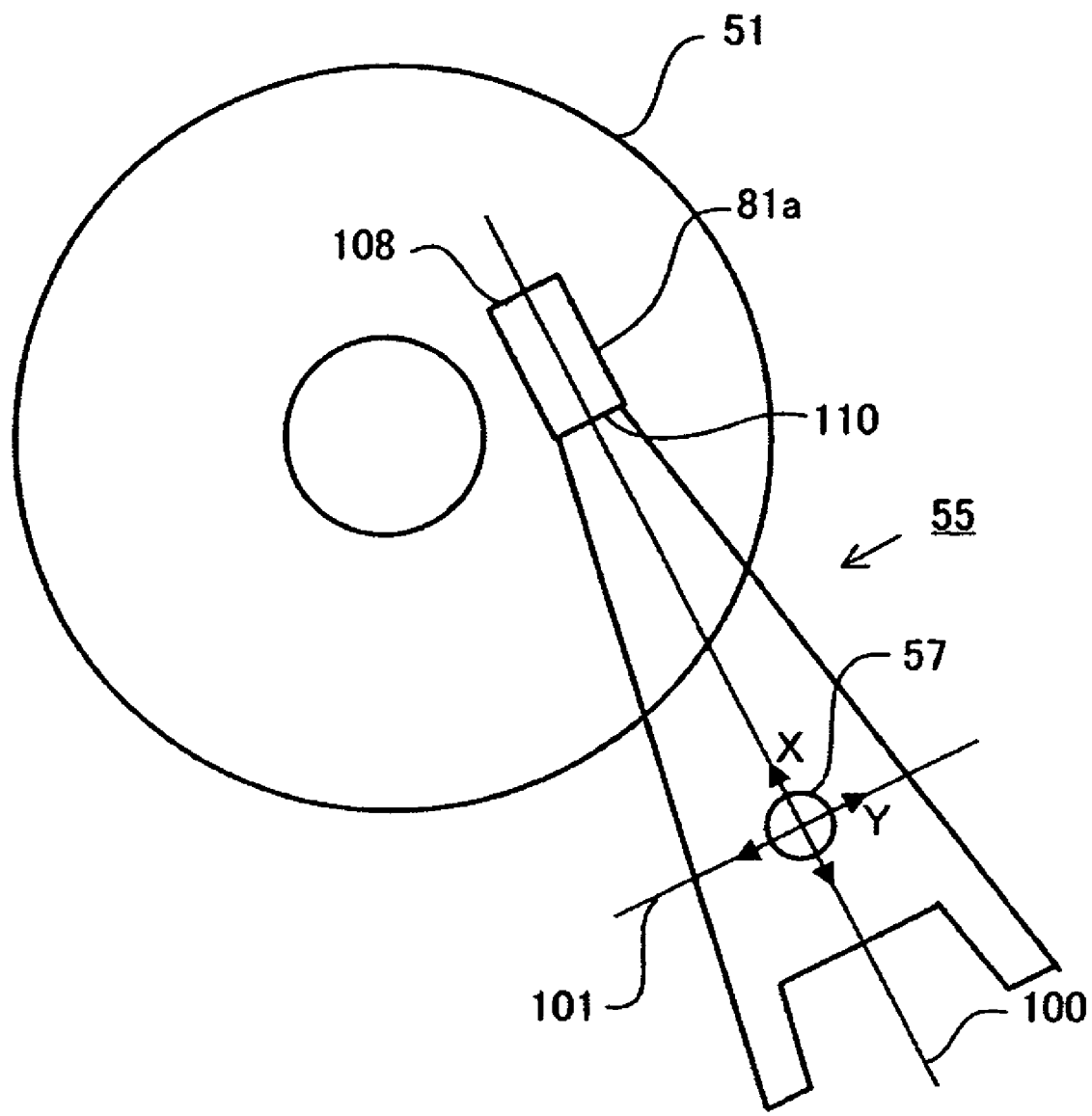
FIG. 5 is a schematic view showing the HSA and a magnetic disk in explaining a pitch attitude and a roll attitude of the HSA.

FIG. 5 is a schematic view showing the HSA 55 and the magnetic disk 51 in explaining a pitch attitude and a roll attitude of the HSA 55. In the HSA 55, a rotation center line 100 of the HSA is defined as a straight line formed by connecting the center of the pivot assembly 57 to middles of edges 108 and 110 on a short side of the head/slider 81a. In the case where the middle of the edge 108 on the short side, the middle of the edge 110 on the short side and the center of the pivot assembly 57 are not aligned on one and the same straight line in a so-called dog leg HSA having a shape curved along the outer periphery of a magnetic disk, a line defined by connecting either of the middle of the edge 108 on the short side, on which the head is disposed, or the middle of the edge 110 on the short side to the center of the pivot assembly 57 is referred to as the rotation center line 100. Here, inclination in a pitch direction expresses a state in which the HSA 55 is inclined in an X direction, that is, in a direction along the rotation center line 100 on the projection formed at the pivot receiving surface as a fulcrum; in contrast, inclination in a roll direction expresses a state in which the HSA 55 is inclined in a Y direction along a line 101 perpendicular to the rotation center line 100.

Figure 6:
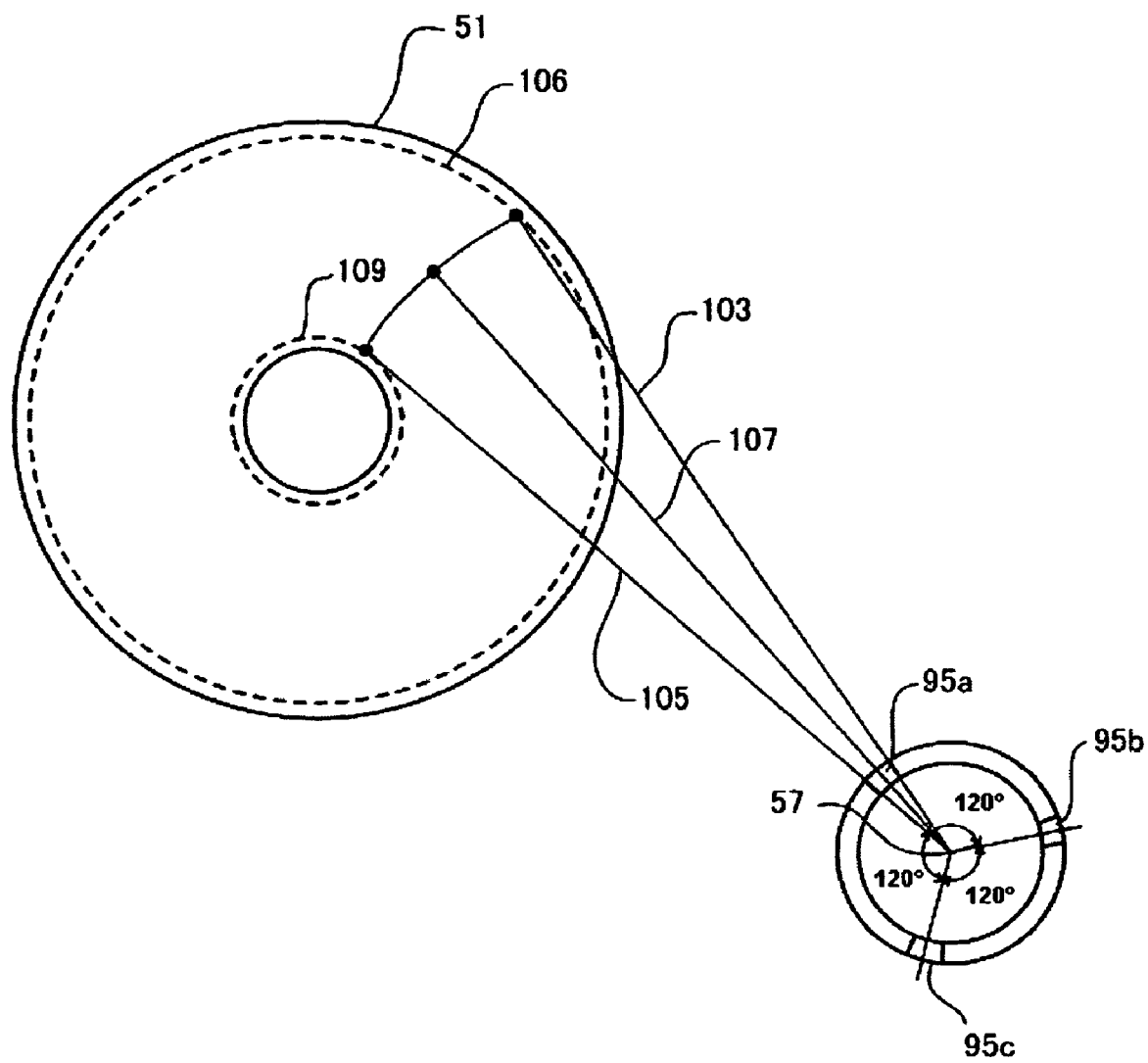
FIG. 6 is a view of the relationship between a rotation center line of the HSA and the arrangement of projections at a pivot receiving surface.

FIG. 6 is a view explanatory of the arrangement relationship between the rotation center line 100 of the HSA 55 and the projections 95a, 95b and 95c at the pivot receiving surface. A dotted line 106 depicted inside of the magnetic disk 51 indicates a limit position at which the head/slider in the HSA 55 flies on the outer peripheral side of the magnetic disk 51. Such a position signifies a position of the lift tab 83a or 83b in contact with the ramp 63 in the magnetic disk drive 50 which adopts the load/unload system. After the lift tabs 83a and 83b ride on an inclined surface of the ramp 63, the head/slider cannot fly only by the flying force caused by an air flow, thereby obviating the problem of flying characteristics of the head/slider, which should be solved by the present invention. In contrast, the above-described position signifies a position at which a further rotating operation of the HSA 55 is restricted owing to the contact with the outer crush stop in the magnetic disk drive which adopts the contact start/stop system.

Another dotted line 109 indicates a limit position at which the head/slider in the HSA 55 flies on the inner circumferential side of the magnetic disk 51. Such a position signifies a position at which a further rotating operation of the HSA 55 is restricted owing to the contact with the inner crush stop 65. A line 103 defined by the rotation center line 100 when the HSA 55 is located at the limit position on the outer peripheral side is referred to as an outside center line. In contrast, a line 105 defined by the rotation center line 100 when the HSA 55 is located at the limit position on the inner circumferential side is referred to as an inside center line.

Additionally, a line 107 bisecting an angle formed between the outside center line 103 and the inside center line 105 is referred to as a middle center line. Here, the first projection, the second projection and the third projection are formed on the boss 91 in such a manner that a line connecting the respective middles of the projections in the circumferential direction forms a regular triangle. The middle center line 107 passes through the first projection 95a. With the pivot receiving surface of the above-described structure, the HSA is fixed to the base 61 by the pivot assembly 57, and then, is rotated between the outside center line 103 and the inside center line 105, thereby measuring the clearance between the actuator arm or the load beam and the surface of the magnetic disk. If it is found that the HSA is inclined in the pitch direction, the pressing die may be corrected in such a manner as to adjust only the height of the first projection 95a. If the second projection 95b and the third projection 95c need be corrected, both of the second projection and the third projection may be corrected by the same height.

In contrast, if it is found that the HSA is inclined in the roll direction, the pressing die may be corrected in such a manner as to adjust the height of either of the second projection 95b and the third projection 95c. Even if the heights of both of the second projection 95b and the third projection 95c need be adjusted, it is easy to predict the attitude of the HSA with respect to respective adjusted heights. The attitude of the HSA with respect to the surface of the magnetic disk is important within the range between the outside center line 103 and the inside center line 105.

In the meantime, the attitudes in the pitch direction and the roll direction are defined in FIG. 5. As shown in FIG. 6, the correction may be accurately reflected at the pivot receiving surface in the direction along the middle center line 107 by correcting the attitude in the pitch direction after the adjustment of the height of the projection 95a. As the HSA is shifted toward the outside center line 103 or the inside center line 105, an error is liable to occur in the adjustment result accurately reflected on the middle center line 107 in accordance with the relationship between the heights of the projections 95b and 95c. However, since the projection 95a is located on the middle center line 107, a distance by which the head/slider is shifted from the middle center line 107 to the outside center line 103 becomes equal to a distance by which the head/slider is shifted from the middle center line 107 to the inside center line 105, and therefore, the error is allocated to both of the lines. Thus, the attitude in the pitch direction within the range in which the head/slider flies may readily fall within a predetermined range only by adjusting the height of the projection 95a.

Like the pivot receiving surface illustrated in FIG. 8, in the case where the projection 95a is aligned on the line connecting the center of the pivot assembly 57 to the rotational center of the magnetic disk and the attitude of the pivot receiving surface in the pitch direction is adjusted by adjusting the height of the projection 95a, the error at the position on the outside center line 103 is liable to frequently occur, and therefore, the heights of the projections 95b and 95c also need be adjusted, thereby making it difficult to correct the pressing die. In addition, with the structure of the pivot receiving surface in the present embodiment, even in the case where the attitude in the pitch direction is adjusted by the heights of the two projections 95b and 95c, a similar effect may be produced at the position on the outside center line 103 or the inside center line 105.

The above-described structure of the pivot receiving surface is particularly effective since the pressing die may be corrected to readily form the projection with high accuracy when the base is made of the steel plate such as a stainless steel plate by pressing, thereby obviating an additional cutting process after the pressing. The method for fabricating the base by the pressing is highly useful owing to a cost lower than that of the conventional base molded by the die casting. An aspect of the present invention may provide the structure of the pivot receiving surface excellent in the attitude adjustment within the flying range of the head/slider in the base molded by the pressing. Incidentally, since the pivot receiving surface in the present embodiment is constituted of the three projections, the time required for the process may be shortened owing to the reduced cut area even if the height is adjusted by cutting the projection after the base is molded by the die casting, and further, the above-described arrangement of the projections may facilitate the cutting work of the projections in order to achieve the predetermined attitude of the HSA between the outside center line and the inside center line.

FIGS. 7(A) to 7(E) are explanatory views of various arrangements of the projections 95a, 95b and 95c encompassed within the scope of the present invention. The arrangement of the projections according to the present invention is not limited to the arrangement in which the lines connecting the projections to each other form the regular triangle, as shown in FIG. 6, but includes other arrangements in which the attitude of the HSA may be readily adjusted within the flying range of the head/slider which is particularly important in the magnetic disk drive. An upper side in FIGS. 7(A) to 7(E) is regarded as the direction of the head/slider.

Figure 7:
FIGS. 7(A) to 7(E) are views of various arrangements of the projections encompassed within the scope of the present invention.
Figure 7:
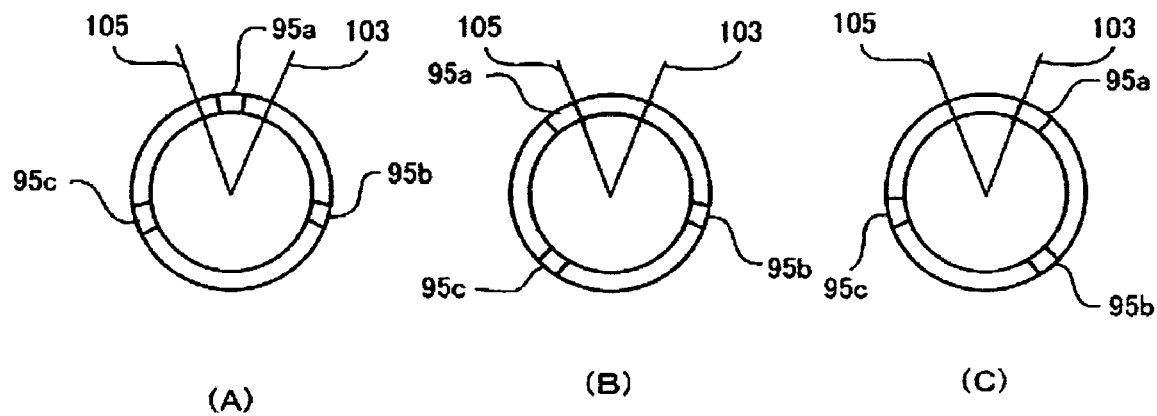
Figure 7:
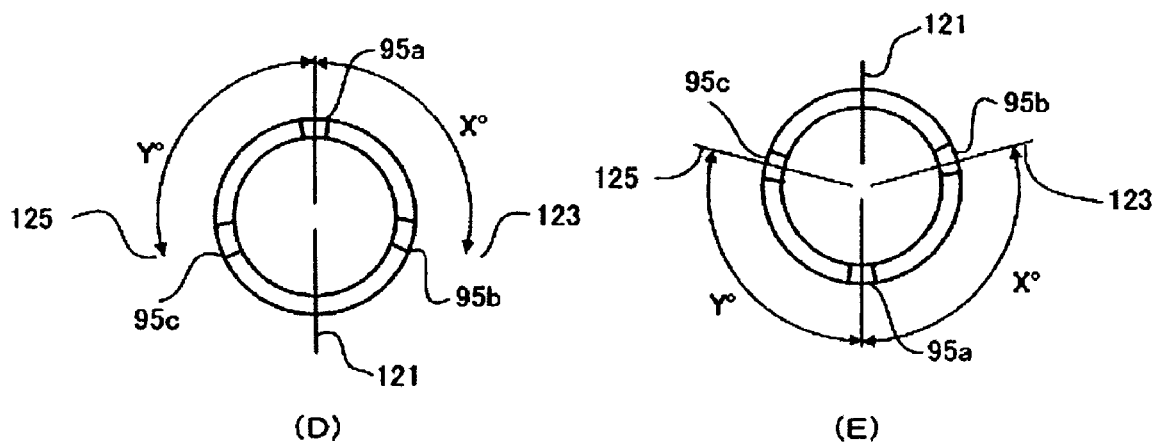

In the examples shown in FIGS. 7(A) to 7(C), the arrangement of the projection 95a is defined in which the pivot receiving surface is constituted such that the attitude in the pitch direction of the HSA may be readily adjusted. In the example shown in FIG. 7(A), the projection 95a is formed between the inside center line 105 and the outside center line 103. When the HSA is rotated, the rotation center line 100 passes through between the inside center line 105 and the outside center line 103, between which the projection 95a is arranged. Otherwise, as shown in FIG. 7(B), the projection 95a may be arranged in such a manner that the inside center line 105 passes through the projection 95a. Alternatively, as shown in FIG. 7(C), the projection 95a may be arranged in such a manner that the outside center line 103 passes through the projection 95a. In examples different from the examples shown in FIGS. 7(A) to 7(C), the projection 95a may be arranged within the above-described range also in the case where the projections 95b and 95c are formed on the side of the head/slider beyond the projection 95a.

FIGS. 7(D) and 7(E) show that the positions of the projections 95b and 95c are defined relative to the projection 95a. In an example shown in FIG. 7(D), the projection 95a is formed on the side of the head/slider: in contrast, in an example shown in FIG. 7(E), the projections 95b and 95c are formed on the side of the head/slider. When a line passing through the center of the pivot assembly 57 and the projection 95a is defined as reference numeral 121, an angle formed between a line 123 passing through the pivot assembly 57 and the projection 95b and the line 121 is designated by X°; in contrast, an angle formed between a line 125 passing through the pivot assembly 57 and the projection 95c and the line 121 is designated by Y°. Explanation will be below on the angles X° and Y° encompassed within the present invention.

The angles X° and Y° need not always be equal to each other. However, if the angles X° and Y° are set to be equal to each other, the correction is facilitated by correcting the pressing dies for forming the projections 95b and 95c in a similar manner according to the inclination even if the HSA is inclined on either side in the roll direction. If the angles X° and Y° are equal to each other, and further, as they become greater from 90° to 180°, a distance between the line connecting the projections 95b and 95c and the projection 95a becomes greater. Consequently, it becomes easy to finely adjust the attitude of the pivot receiving surface owing to the height adjustment of the projection 95a in adjusting the attitude in the pitch direction. Moreover, if the angles X° and Y° are equal to each other, and further, as they become smaller from 180° to 90°, a distance between the projections 95b and 95c becomes greater. As a consequence, it becomes easy to finely adjust the attitude of the pivot receiving surface owing to the height adjustment of the projection 95b or the projection 95c in adjusting the attitude in the roll direction. As a result, when each of the angles X° and Y° is 120°, the inclinations in the pitch direction and in the roll direction may be corrected in best balance.

If each of the angles X° and Y° becomes 90° or smaller, some method need be adopted so as to stably support the pivot assembly by the pivot receiving surface. Although the description has been given of the embodiment in which the pivot receiving surface is constituted of the projections 95a to 95c formed at the boss of the base, the projections are not always formed on the top of the boss, but they may be formed at the flat surface of the base.

Figure 9:
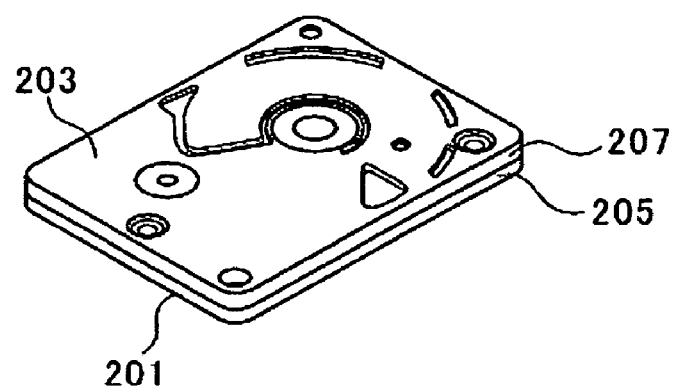
FIGS. 9(A) to 9(D) are views of a seal position between the base and a base cover.
Figure 9:
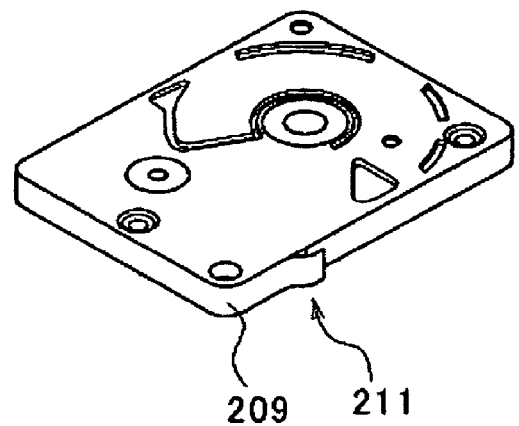
Figure 9:
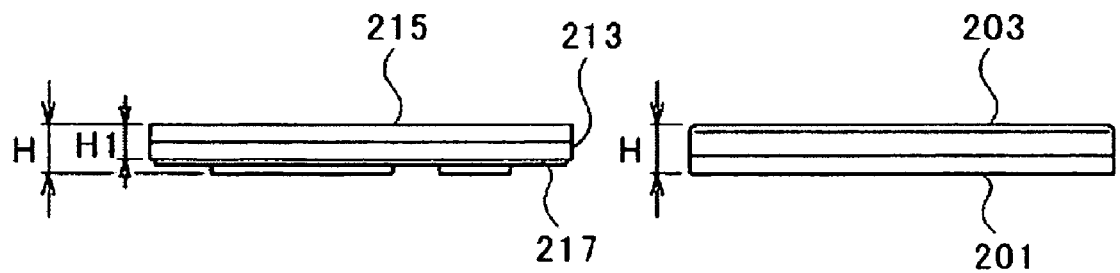

FIGS. 9(A) to 9(D) are explanatory views of a seal position between a base and a base cover in the magnetic disk drive 50. FIG. 9(A) shows a base 201 and a base cover 203, which have a bonded surface 205 on the side of the base 201 and a bonded surface 207 on the side of the base cover 203, respectively, as surfaces to be bonded with a seal tape 209. FIG. 9(B) shows a terminal position 211, at which a starting end and a finishing end overlap each other when the seal tape 209 is bonded, set at a position apart from the magnetic disk.

As shown also in FIG. 1, the end of the magnetic disk is located near the base inside of the base. Consequently, if the overlapping ends of the seal tape are set at a position near the end of the magnetic disk, a force is exerted at the side surface of the base or the base cover by a finishing end processing for bonding the seal tape, thereby raising a possibility of a damage on the magnetic disk due to a contact with the base or the base cover. The magnetic disk may be prevented from being housed near the base or the base cover by setting the terminal position at a position shown in FIG. 9(B), thereby solving the above-described problem of the occurrence of a damage on the magnetic disk.

FIG. 9(C) shows a combination of a base 213 and a base cover 215 whose side surfaces are bonded with a seal tape. To the lower surface of the base 213 is fixed a circuit board 217. The entire magnetic disk including the base 213, the base cover 215 and the circuit board 217 has a thickness H. The seal tape bonded surface has a width H1. In FIG. 9(D), the base 201 and the base cover 203 have an entire thickness H. Since the base 201 is formed into a box shape by bending the edge of the base 201 downward, the circuit board is housed inside of the box, and therefore, it cannot be shown. In FIG. 9(D), the thickness H serves also as a width of the seal tape bonded surface. As a consequence, the thickness of the entire magnetic disk is set to be equal to that in FIG. 9(C), thereby increasing the width of the seal tape bonded surface and enhancing sealing performance.

A description will be given below of a step at the surfaces of the base and the base cover bonded with the seal tape 209 in reference to FIGS. 14(A) and 14(B). It is desirable that the bonded surface 205 on the base side and the bonded surface 207 on the base cover side serving as the surfaces bonded with the seal tape 209 should be flush with each other. However, in actuality, either one of the bonded surfaces 205 and 207 becomes higher than the other caused by a dimensional tolerance. In this case, a step is generated between the bonded surface 205 on the base side and the bonded surface 207 on the base cover side, thereby generating a region in which the seal tape cannot be tightly bonded. In the case where the length of the bonded surface 207 on the base cover side (i.e., a dimension in a vertical direction in FIGS. 14(A) and 14(B), and hereinafter the same) is less than that of the bonded surface 205 on the base side, the seal tape 209 is bonded to the bonded surface on the base cover side at a greater bonded area.

Figure 14:
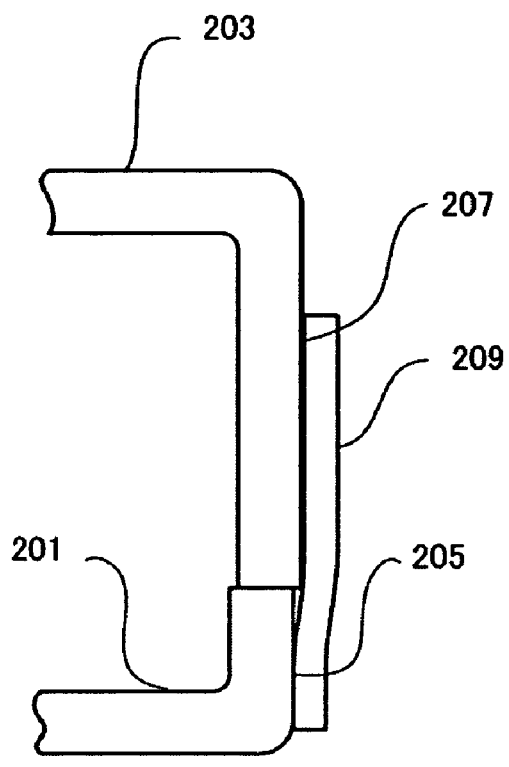
FIGS. 14(A) and 14(B) are views of a step at a bonded surface of a seal tape bonded to the base and the base cover.
Figure 14:
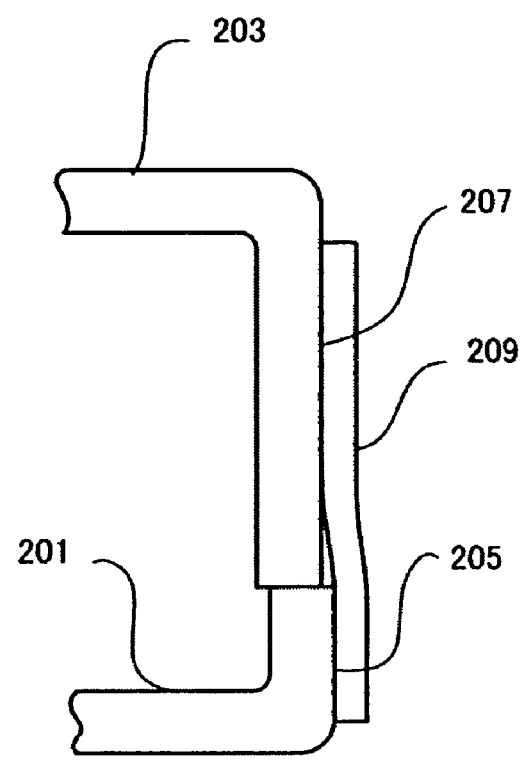

As shown in FIG. 14(A), if the outer dimension and the tolerance are set in such a manner that the base 201 having the short surface bonded with the seal tape 209 is sunk, the region in which the seal tape cannot be tightly bonded to the bonded surface is generated at the bonded surface 205 on the base side when the step is generated between the bonded surface 205 on the base side and the bonded surface 207 on the base cover side, thereby making it impossible to secure a sufficient bonded area. In contrast, as shown in FIG. 14(B), if the outer dimension and the tolerance are set in such a manner that the base cover 203 having the long surface bonded with the seal tape 209 is sunk, the region in which the seal tape cannot be tightly bonded to the bonded surface due to the step generated between the bonded surface 205 on the base side and the bonded surface 207 on the base cover side is formed at the bonded surface 207 on the base cover side which has the long bonded surface, thus satisfactorily securing the bonded area.

Figure 10:
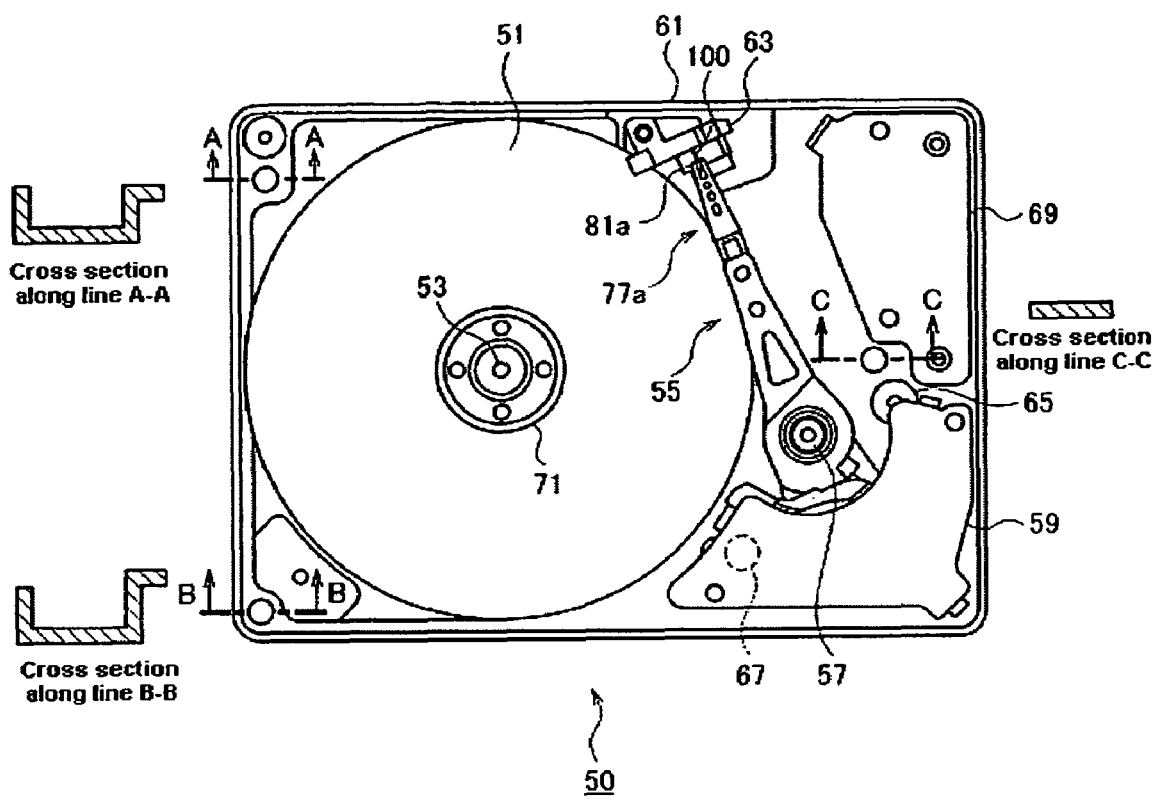
FIG. 10 is a view of a reference position of the base.
Figure 11:
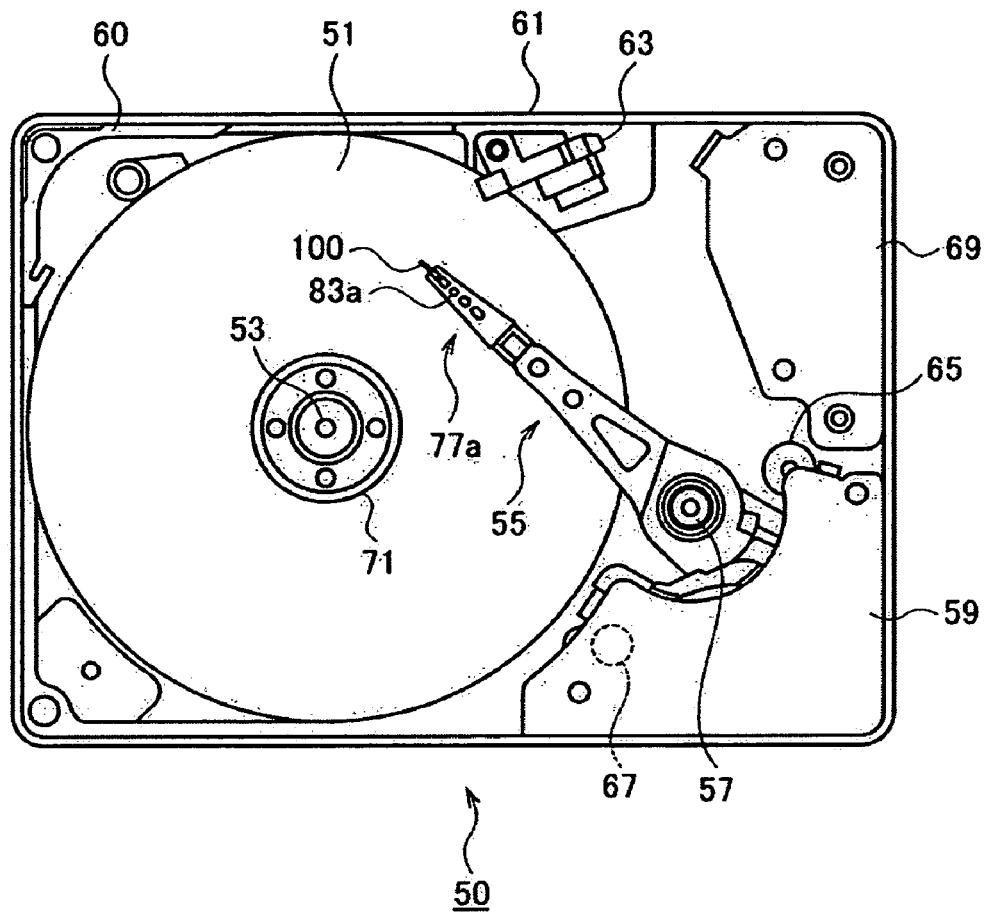
FIG. 11 is a view of a structure for accurately positioning the base cover with respect to the base.

FIG. 10 is a view explanatory of a reference position of the base in the magnetic disk drive 50. If the reference position is located at a sunk position or a projecting position more than the surroundings as shown in an A-A cross section, a B-B cross section or a C-C cross section, the pressing die may be readily corrected. FIG. 11 is a view explanatory of a structure for accurately positioning the base cover with respect to the base. In the magnetic disk drive of the type in which the side surfaces of the base and the base cover are used as the seal tape bonded surfaces, as shown in FIGS. 9(A) to 9(D), it is important to position the base cover with respect to the base from the viewpoint of keeping air-tightness. In FIG. 11, component parts such as the flexible cable fixing plate 69, the voice coil yoke 59 and a filter 60 which are originally provided in the magnetic disk drive are configured in such a manner as to project from the edge of the base 61, and further, the ends are set to match with the inner surface of the base. When the base 61 is covered with the box-shaped base cover, the base cover may be accurately positioned with respect to the base under the guidance of the above-described component parts.

Figure 12:
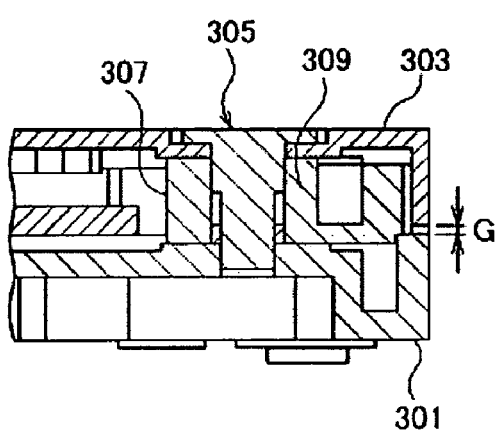
FIGS. 12(A) and 12(B) are views of a structure for preventing any deformation of the base cover when the base cover is fixed to the base via a screw.
Figure 12:
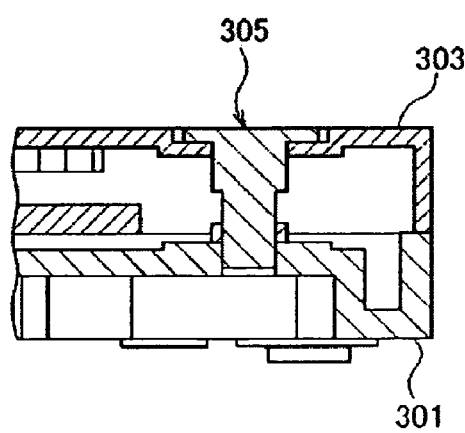

FIGS. 12(A) and 12(B) are explanatory views of a structure for preventing any deformation of a base cover 303 when the base cover 303 is fixed to a base 301 via a screw. As shown in FIG. 12(B), the base 301 and the base cover 303 are fixed via a screw 305 in abutment against each other. As shown in FIG. 12(A), spacers 307 and 309 are interposed between the base 301 and the base cover 303, thereby forming a gap G between the edge of the base 301 and the edge of the base cover 303. In this manner, it is possible to prevent any deformation of the edge of the base cover 303 in abutment against the edge of the base 301 in fixing the base cover to the base via the screw. There arises no problem since the gap is tightly sealed with the seal tape.

Figure 13:
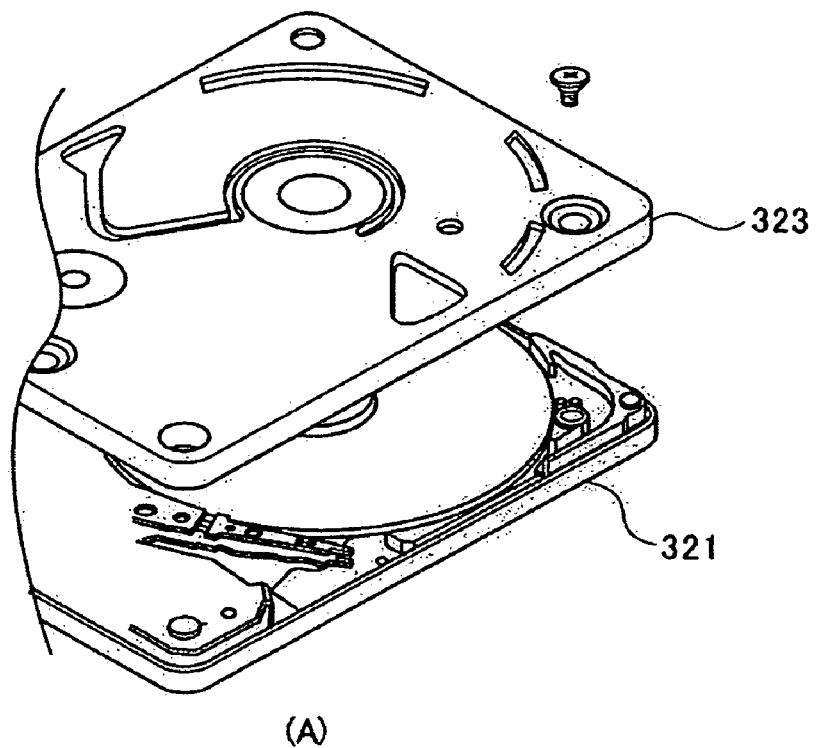
FIGS. 13(A) to 13(C) are views of the screw for use in two functions of fixing and positioning when the base cover is fixed to the base.
Figure 13:
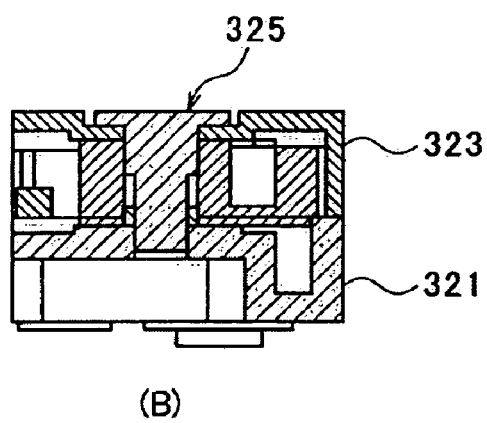
Figure 13:
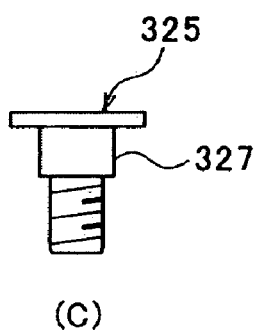

FIGS. 13(A) to 13(C) are explanatory views of a screw 325 for use in two functions of fixing and positioning in fixing a base cover 323 to a base 321. A step 327 is formed at the screw 325. The step 327 is fitted into a through hole formed at the base cover 323, thereby positioning and fixing the base cover.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A pivot assembly having a pivot receiving surface for rotatably supporting a head supporting mechanism having a head/slider flying over a magnetic disk mounted thereon, the pivot receiving surface comprising:

a first projection, a second projection and a third projection for supporting an abutment surface of the pivot assembly with each top surface of the projections wherein, the first projection is formed at a position through which an outside center line Or an inside center line passes, or between the outside center line and the inside center line through which a rotation center line passes when the rotation center line of the head supporting mechanism is defined as a line passing through the center of the pivot assembly and the center of an edge on a side on which a head in the head/slider is mounted, the inside center line is defined as a line of the rotation center line when the head/slider is located at the most inside position at which the head/slider flies over the magnetic disk, and the outside center line is defined as a line of the rotation center line when the head/slider is located at the most outside position at which the head/slider flies over the magnetic disk;

the second projection is formed in one region of the base bisected by the Rotation center line passing through the first projection; and the third projection is formed in the other region of the base bisected by the rotation center line passing through the first projection.

2. A pivot assembly as claimed in claim 1, wherein the first projection is formed at a position through which the rotation center line for bisecting an angle defined between the inside center line and the outside center line passes.

3. A pivot assembly as claimed in claim 1, wherein the first projection is formed nearer the head/slider than the second projection and the third projection.

4. A pivot assembly as claimed in claim 1, wherein the second projection and the third projection are formed nearer the head/slider than the first projection.

5. A pivot assembly as claimed in claim 1, wherein the length of a line connecting the first projection to the second projection is equal to the length of a line connecting the first projection to the third projection.

6. A pivot assembly as claimed in claim 5, wherein the lengths of lines mutually connecting the first projection, the second projection and the third projection are equal to each other.

7. A pivot assembly as claimed in claim 1, wherein the first projection, the second projection and the third projection are formed at a boss at a base of a magnetic disk drive.

8. A pivot assembly as claimed in claim 1, wherein the first projection, the second projection and the third projection are molded by pressing a steel plate.

9. A pivot assembly as claimed in claim 1, wherein the most inside position, at which the head/slider flies above the magnetic disk, is a position at which the head supporting mechanism is brought into contact with an inner crush stop.

10. A pivot assembly as claimed in claim 1, wherein the most outside position, at which the head/slider flies above the magnetic disk, is a position at which the head supporting mechanism is brought into contact with an outer crush stop.

11. A pivot assembly as claimed in claim 1, wherein the most outside position, at which the head/slider flies above the magnetic disk, is a position at which a lift tab of the head supporting mechanism is brought into contact with a ramp.

12. A pivot assembly as claimed in claim 1, wherein the head supporting mechanism is a head stack assembly including a load beam and a carriage assembly to be driven by a voice coil motor.

13. A magnetic disk drive comprising:
a base;
a magnetic disk rotatably attached to the base;
a head stack assembly having a head/slider mounted thereon, the head/slider having access to the magnetic disk;
a pivot assembly having an abutment surface and fixed to the base so as to rotatably support the head stack assembly; and
a first projection, a second projection and a third projection formed at the base, for supporting the abutment surface of the pivot assembly with each top surface of the projections;
the first projection being formed at a position, through which an outside center line or an inside center line passes, or between the outside center line and the inside center line through which the rotation center line passes when the rotation center line of the head supporting mechanism is defined as a line passing through the center of the pivot assembly and the center of an edge on a side on which a head in the head/slider is mounted, the inside center line is defined as a line of the rotation center line when the head/slider is located at the most inside position at which the head/slider flies over the magnetic disk, and the outside center line is defined as a line of the rotation center line when the head/slider is located at the most outside position at which the head/slider flies over the magnetic disk;
the second projection being formed in one region of the base bisected by the rotation center line passing through the first projection; and
the third projection being formed in the other region of the base bisected by The rotation center line passing through the first projection.

14. A magnetic disk drive as claimed in claim 13, wherein the first projection is formed at a position through which the rotation center line for bisecting an angle defined between the inside center line and the outside center line passes.

15. A magnetic disk drive as claimed in claim 13, wherein the first projection, the second projection and the third projection are formed on one and the same circle whose center coincides with that of the pivot assembly.

16. A magnetic disk drive as claimed in claim 15, wherein the length of a line connecting the first projection to the second projection is equal to the length of a line connecting the first projection to the third projection.

17. A magnetic disk drive as claimed in claim 13, the magnetic disk drive adopting a contact start/stop system, wherein the most outside position, at which the head/slider flies above the magnetic disk, is a position at which the head stack assembly is brought into contact with an outer crush stop.

18. A magnetic disk drive as claimed in claim 13, the magnetic disk drive adopting a load/unload system, wherein the most outside position, at which the head/slider flies above the magnetic disk, is a position at which a lift tab of the head stack assembly is brought into contact with a ramp.

19. A magnetic disk drive as claimed in claim 13, wherein the most inside position, at which the head/slider flies above the magnetic disk, is a position at which the head stack assembly is brought into contact with an inner crush stop.

20. A magnetic disk drive as claimed in claim 13, wherein the base is molded by pressing a steel plate.

* * * * *